(12) United States Patent
Konduri et al.

(10) Patent No.: US 11,689,412 B2
(45) Date of Patent: Jun. 27, 2023

(54) AUTOMATED MONITORING OF INFRASTRUCTURE AND APPLICATION ON CLOUD

(71) Applicant: Capital One Services, LLC, McLean, VA (US)

(72) Inventors: Prasad Konduri, Ashburn, VA (US); Kadhiresan Kanniyappan, Ashburn, VA (US); Manohar Malapati, Plano, TX (US); Cory Williams, Vienna, VA (US); Kevin P. Poffenberger, Townsend, DE (US); Aruna Alla, McLean, VA (US); Bhaskar Banerjee, Plano, TX (US); Joseph Knight, Dallas, TX (US); Cuong Ly, Dallas, TX (US); Patrick Barnes, Mckinney, TX (US); Elijah Carter, Alexandria, VA (US); Srinivasan Subramanian, Newark, DE (US); Paul Pelayo, New York, NY (US); Raghava Bidathanapalli, Ashburn, VA (US); Priyanka Kulkarni, Mckinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/393,744

(22) Filed: Aug. 4, 2021

(65) Prior Publication Data
US 2023/0039822 A1   Feb. 9, 2023

(51) Int. Cl.
*H04L 41/0681* (2022.01)
*H04L 67/025* (2022.01)

(52) U.S. Cl.
CPC ........ *H04L 41/0681* (2013.01); *H04L 67/025* (2013.01)

(58) Field of Classification Search
None
See application file for complete search history.

(56) References Cited

U.S. PATENT DOCUMENTS

| 7,688,813 | B2 * | 3/2010 | Shin ........................ H04L 67/04 709/224 |
| 9,800,489 | B1 * | 10/2017 | Polyanskiy ............. H04L 43/12 |
| 10,673,706 | B2 | 6/2020 | Garcia et al. |
| 10,902,207 | B2 | 1/2021 | Guerra et al. |
| 2013/0036359 | A1 * | 2/2013 | Campagnoni ....... G06F 11/3093 715/736 |
| 2015/0081883 | A1 | 3/2015 | Katz et al. |

(Continued)

FOREIGN PATENT DOCUMENTS

JP   2004289392 A   * 10/2004

*Primary Examiner* — Younes Naji
(74) *Attorney, Agent, or Firm* — Sterne, Kessler, Goldstein & Fox P.L.L.C.

(57) ABSTRACT

Disclosed herein are system, method, and computer program product embodiments for determining monitoring compliance for an enterprise application deployed on an application delivery platform. Existing resources, monitors and alerts are discovered with gaps in monitoring being calculated based on a comparison of monitoring objectives and the existing monitors and alerts. Gaps in monitoring are reported in a GUI reflecting effectiveness of existing monitors.

20 Claims, 7 Drawing Sheets

(56) References Cited

U.S. PATENT DOCUMENTS

2015/0310139 A1* 10/2015 Desikachari ..... G06Q 10/06315
                                                        703/2
2017/0371648 A1* 12/2017 Fabrizi .................. G06F 11/302
2020/0326819 A1   10/2020 Martin et al.

* cited by examiner

FIG. 6

Tier 0 Critical | Tier 0 All ASVs | Tier 0 Digital Resil. | Tier 1 Critical | Trending Chart ■ Compliance 100%    ▨ Compliance .1-99%    □ Compliance 0%    _602_

Monitor/Alert Setup Compliance - Aggregate View

_606_ | _608_ | _610_
0% 20% 40% 60% 80% 100%

Alert Notification Compliance - Aggregate View

_612_ | _614_ | _616_
0% 20% 40% 60% 80% 100%

Card Tech
Cloud/Production
Commercial Tech
EDML
Enterprise
Financial Serv.
0% 20% 40% 60% 80% 100%
_622_

Card Tech
Cloud/Production
Commercial Tech
EDML
Enterprise
Financial Serv.
0% 20% 40% 60% 80% 100%
_620_

_618_

| Term | Description | _604_ |
|---|---|---|
| Tier 0 | Key metric used to drive alert and self healing response for failover<br>Qualifying criteria includes:<br>  Alert would require an immediate response assistance<br>  Metrics alert is actionable | |
| Tier 1 | Key metric used to drive the following:<br>  Alerting - indicates an issue<br>  Troubleshooting<br>  Tuning and capacity planning<br>  Metric may be informational rather than directly actionable | |

AUTOMATED MONITORING OF INFRASTRUCTURE AND APPLICATION ON CLOUD

BACKGROUND

When deploying enterprise applications, monitoring requirements are often overlooked or relegated for future consideration. Monitoring is commonly directed to creating awareness of performance and availability of software applications. Monitoring also strives to detect and diagnose complex application performance problems to maintain an expected level of service.

Reasons for not setting up proper monitoring processes include, but are not limited to, a high learning curve because of a programmer's knowledge gaps, lack of standardization of monitors, requirements for manual configuration and upkeep. As such, establishing high standards for monitoring processes creates a burden on developers, increases time-to-market and leads to missed notifications. Without proper monitoring processes, failure points include, increased Time-To-Detect (TTD) and Time-To-Resolve (TTR), no integration with deployment pipeline, no cognizance (i.e., unmonitored systems), multiple iterations of configuring monitors until meeting compliance and manual upkeep for new metrics.

BRIEF DESCRIPTION OF THE DRAWINGS/FIGURES

FIG. 6 depicts a user interface diagram illustrating monitoring compliance status, according to some embodiments.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for determining compliance with enterprise software monitoring requirements. This technology allows for establishing compliance monitoring subsequent to the deployment phase. While example embodiments described herein are directed to an enterprise environment, the system and processes may be applied to any environment.

Various embodiments of these features will now be discussed with respect to the corresponding figures.

Figure 1:
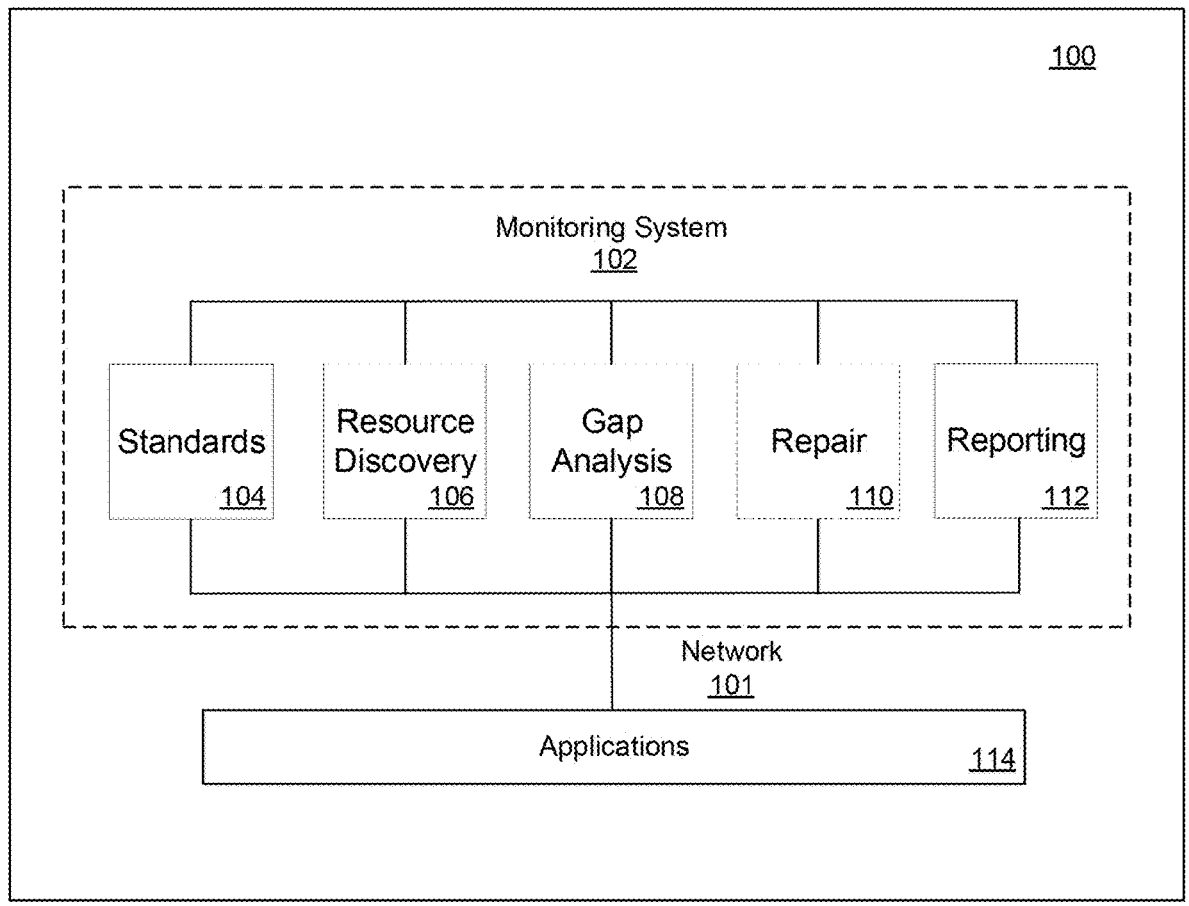
FIG. 1 depicts a block diagram of a system for determining compliance with enterprise application monitoring requirements, according to some embodiments.

FIG. 1 depicts a block diagram of an exemplary enterprise environment 100 (e.g., local server environment or cloud environment) that may be continuously monitored for compliance with enterprise application monitoring standards, consistent with disclosed embodiments. The components and arrangements shown in FIG. 1 are not intended to limit the disclosed embodiments, as the components used to implement the disclosed processes and features may vary. Thus, enterprise environment 100 may further include other components that perform or assist in the performance of one or more processes consistent with the disclosed embodiments.

Enterprise environment 100 may include one or more server devices (e.g., a host server, a web server, an application server, etc.), a data center device, or a similar device. Each of these devices are configured for interoperability with monitoring system 102 for monitoring enterprise applications 114, via network 101. In some embodiments, the server may be implemented as a plurality of servers that function collectively as a cloud database for storing/processing data received from monitoring system 102. In accordance with disclosed embodiments, enterprise environment 100 may include one or more modules including one or more management servers, cloud computing platform(s), data center(s), client device(s), and databases communicating over one or more networks. In some embodiments, various components of enterprise environment 100 may be physically disposed within an office building or physical location associated with an entity (e.g., an organization technology assets); however, such components may also be disposed in physically separate locations but connected via network 101 administered by or associated with the entity.

Network 101 may include one or more wired and/or wireless networks. For example, the network 101 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Enterprise monitoring system 102 may include a plurality of modules, such as a standards module 104, resource discovery module 106, gap analyzer module 108, optional repair module 110 and reporting (i.e., notification) module 112. The enterprise monitoring system 102 implements monitoring tools, which further helps measure performance to reduce Mean-Time-To-Detect/Mean-Time-To-Resolve (MTTD/MTTR) an incident/outage of an IT service/network and aid in enhancing application availability, as well as predict application and infrastructure performance proactively and reports on the data points.

Standards module 104 may include a database of monitoring, alerting and performance standards. In one example, two sets of performance metrics are closely monitored. A first set of performance metrics defines a performance experienced by end users of the application. One example of performance is average response times under peak load. The components of the set include load and response times. The load is the volume of transactions processed by the application, e.g., transactions per second (TPS), requests per second, and pages per second. The response times are the times required for an application to respond to a user's actions at such a load. A second set of performance metrics may measure computational resources used by the application for the load.

Resource discovery module 106 may include one or more processing elements to discover resources available to each of the enterprise applications 114. For example, an enterprise application 114 may be operative with a processor 704, hard disk drive 712 and removable storage unit 718, each of which is a computational resource and may be monitored.

Gap analysis module 108 may include one or more processing elements to compare the standards and resources to actual monitoring services in-place for each of the enterprise applications 114. The comparison reveals gaps in expected monitoring standards as compared to actual monitor's setup after enterprise application deployment.

Optional repair module 110 may include one or more processing elements to add monitors based on the gap analysis. Monitors are added based on the standards and resources to provide updated monitoring services for each of the enterprise applications 114. The repair module closes (reduces) gaps in expected monitoring standards as compared to existing monitors previously setup after enterprise application deployment.

Reporting module 112 may include one or more processing elements to create user interfaces with graphics reflecting existing monitors, gaps in monitoring and generate corresponding reports. An example reporting/notification GUI is provided in association with FIG. 6.

Figure 2:
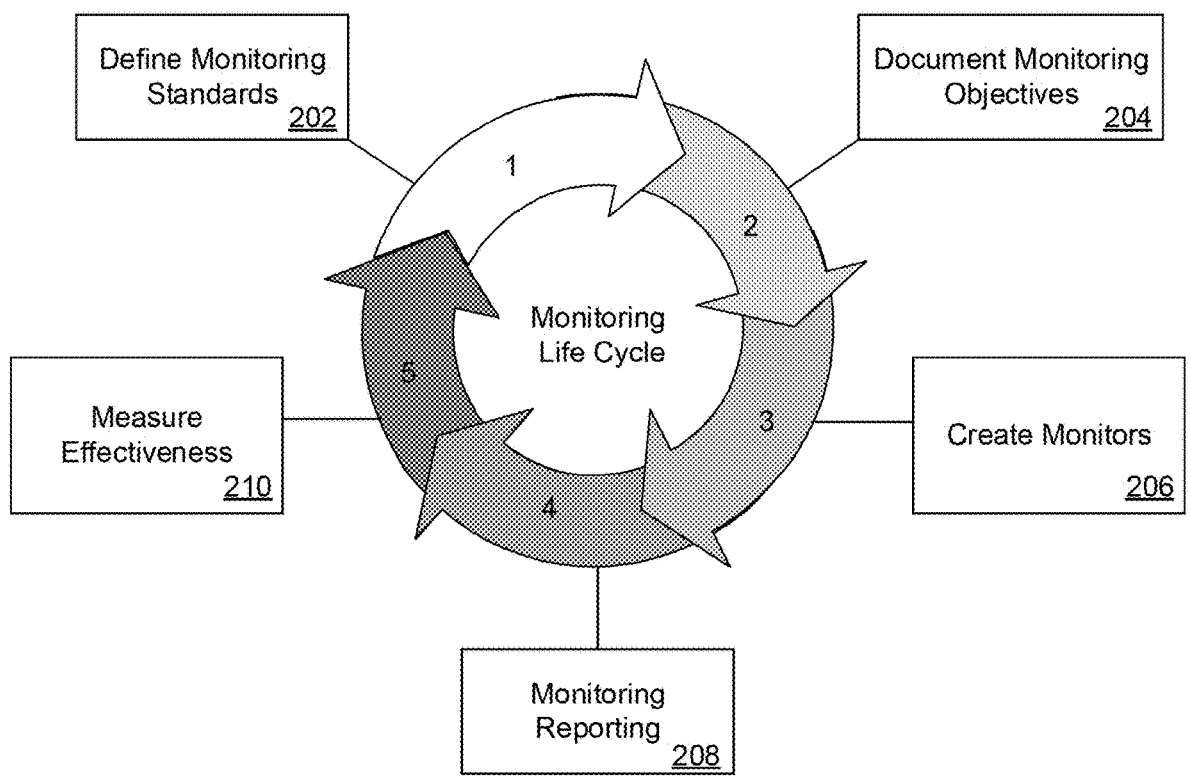
FIG. 2 depicts a life cycle diagram for creating monitors at enterprise application deployment, according to some embodiments.

FIG. 2 depicts a life cycle diagram 200 for creating monitors at enterprise application deployment, according to some embodiments.

In stage 1 (202), monitoring standards and metrics are defined. Monitoring standards and metrics are defined based on standardized monitors in alignment with engineering excellence (ENGX) standards, site reliability engineering (SRE), operational excellence enterprise architecture, enterprise monitoring, enterprise SRE, resiliency and risk, and lines of business LOB. While described throughout as monitoring standards, these standards are equally applicable to alerting and resource standards. For example, a known alerting standard is to provide an alert for an application reaching X percent load capacity. In another example, an application should monitor specific resources assigned to handle proper processing (e.g., threshold response time) at load.

In stage 2 (204), monitoring objectives are documented (created and stored). Monitoring objectives include, but are not limited to, a set of application performance and infrastructure objectives to pro-actively and reactively enhance application availability.

In stage 3 (206), monitors are created. Monitors (and alerts) are created based on the previously defined monitoring objectives (application and infrastructure). Example monitors include, but are not limited to, Latency Monitor, Throughput Monitor, Error Monitor, CPU Monitor and alerting on each of these.

In stage 4 (208), monitoring and reporting take place. The reporting is configured to provide an enterprise application (s) owner a mechanism to review its adherence to the standards in monitoring and a user interface (UI) presenting a monitoring status dashboard. For example, adherence may indicate that all mandatory availability indicators are monitored. Whereas, non-adherence may indicate that not all mandatory availability indicators are monitored.

In stage 5 (210), the effectiveness of the monitoring is measured. The effectiveness measurements provide an enterprise application (s) owner a mechanism to tune the monitors and alerts, thus leveraging the analytical insights from monitoring. Effectiveness is measured as (number of monitors found *100)/numbers of expected monitors) for each resource type, like database, disk, server, etc. Effectiveness is illustrated in an infrastructure/application dashboard created in the monitoring tool (e.g., as shown in FIG. 6).

Figure 3:
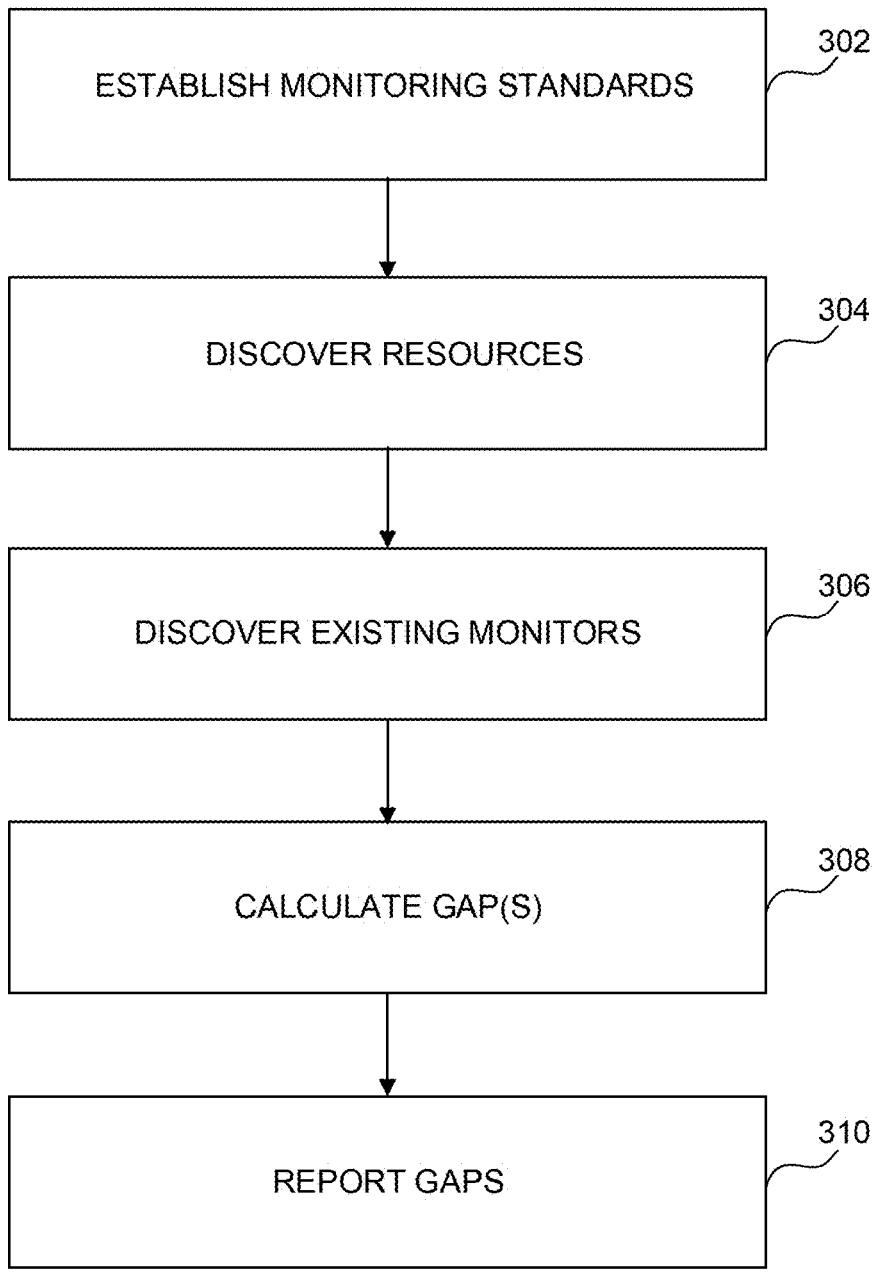
FIG. 3 depicts a flow diagram illustrating a flow for ensuring compliance with enterprise application monitoring requirements, according to some embodiments.

FIG. 3 depicts a flow diagram 300 illustrating a flow for determining compliance with enterprise application monitoring requirements, according to some embodiments.

As a non-limiting example with regards to FIGS. 1 and 2, one or more processes described with respect to FIG. 3 may be performed by monitoring system 102 (e.g., as shown in FIG. 1) for determining compliance with enterprise software monitoring requirements. In embodiment 300, monitoring system 102 may execute code in memory to perform certain steps associated with FIGS. 1, 2 and 4-6. Monitoring system 102 determines whether the requested data is stored locally (e.g., on a server) or remotely (e.g., in the cloud).

In step 302, monitoring system 102, creates a database of standards. Standards would typically be established pre-deployment and lay the groundwork for successful monitoring post-deployment. The standards may establish common monitoring standards across a common organization or enterprise. In addition, the standards also may establish best practices for which resources need which monitors or alerts. Once established, the monitors may be organized into tiers based on urgency of response or criticality (See FIG. 6).

In one embodiment, monitoring system 102 would allow customization of monitoring standards based on, but not limited to, gap thresholds (e.g., level required before an action takes place), monitoring duration, alerting priority, etc., based on an enterprise's application or infrastructure (current or future).

In step 304, monitoring system 102 discovers resources that are needed/available to each of the enterprise applications 114. For example, the monitoring system 102 determines computational resources needed/used by an application for a load, indicating whether there is adequate capacity to support the load, as well as possible locations of a performance bottleneck. In one embodiment, the monitoring processes as described herein may be triggered automatically during application deployment on an application delivery platform (See FIG. 5).

In one embodiment, this discovery process may include a series of operations: search for availability of indicator metric to figure out the presence of a resource type (e.g., check for request count to find presence of a load balancer or check for database connections to figure out presence of a database); search for monitors with specific metric to figure out whether it is monitoring a specific standard (metric); compare the discovered monitors against those in the standards database (e.g., for a database the system monitors an active connection count while the programmers may only be measuring database CPU performance, leading to a monitoring gap). In various embodiments, the discovery may be performed using APIs provided by the monitoring tools.

In step 306, monitoring system 102 discovers existing monitors and alerts that have been previously set up for each of the enterprise applications 114.

In step 308, monitoring system 102 calculates gaps in monitoring, resources and alerts by comparing the established monitoring standards and resources to monitoring services in-place for each of the enterprise applications 114.

The comparison reveals gaps in expected monitoring standards as compared to actual monitor's setup after enterprise application deployment.

In step 310, monitoring system 102 reports gaps in monitoring, resources and alerts. In one alternative embodiment, needed monitors, resources and alerts may be optionally added based on the established standards and resources available. These repairs would close (reduce) the gaps in expected monitoring standards as compared to actual monitors setup after enterprise application deployment.

Figure 4:
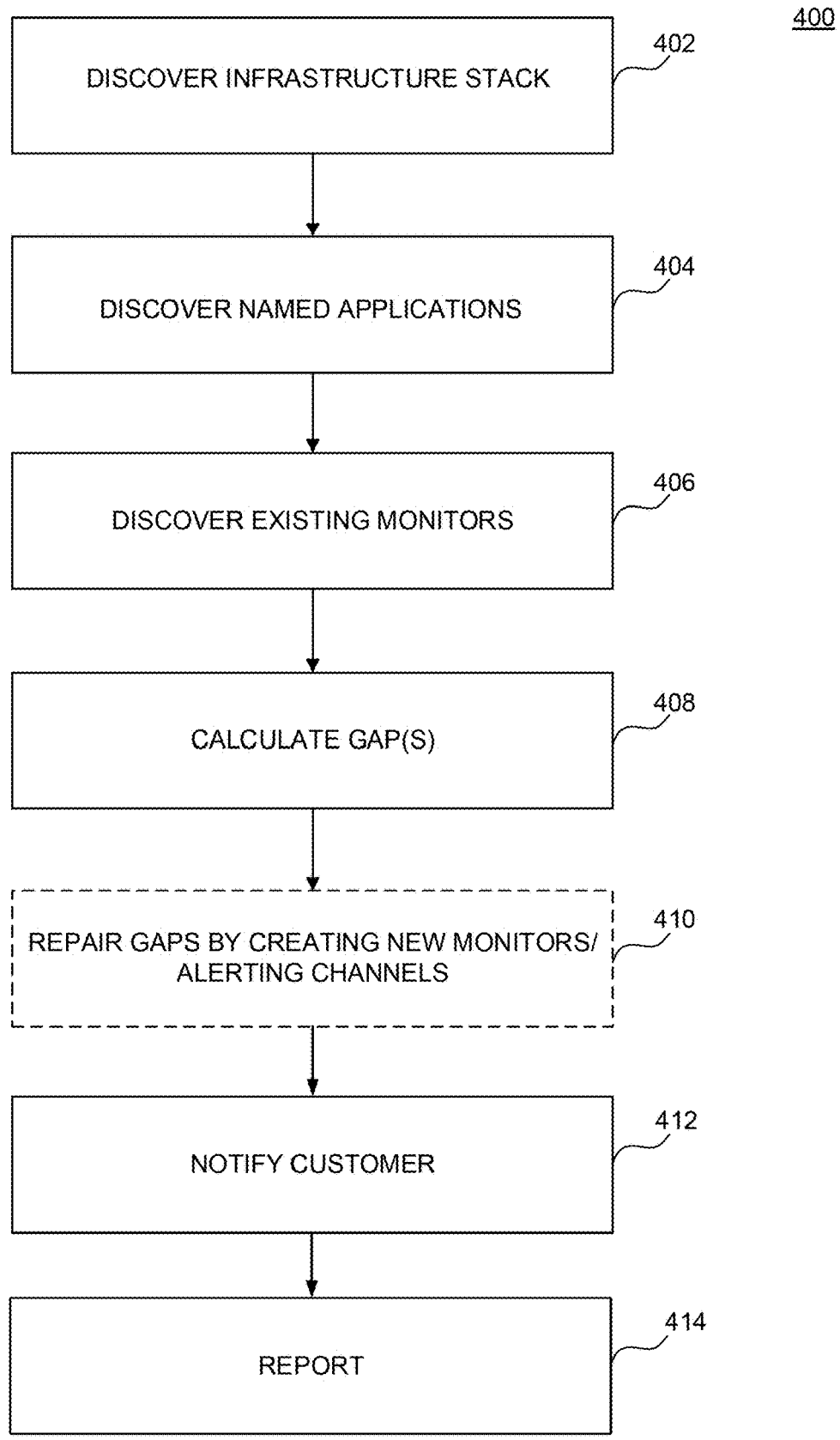
FIG. 4 depicts another flow diagram illustrating a flow for ensuring compliance with enterprise application monitoring requirements, according to some embodiments.

FIG. 4 depicts another flow diagram 400 illustrating a flow for determining compliance with enterprise application monitoring requirements, according to some embodiments. It is to be appreciated that not all steps may be needed to perform the disclosure provided herein. Further, some of the steps may be performed simultaneously or in a different order than shown in FIG. 4, as will be understood by a person of ordinary skill in the art.

Assuming that a database of standards has previously been created, these standards may be referred to for successful monitoring post deployment. In one embodiment, the monitoring processes as described herein may be triggered automatically during application deployment on an application delivery platform.

In step 402, monitoring system 102 discovers an infrastructure stack for enterprise applications 114. For example, monitoring system 102 determines a collection of infrastructure elements defined and changed as a unit. The enterprise application resources include, but are not limited to, an infrastructure stack or a container, all of which are referenced by commonly used tags. In operation, APIs may be used to query for indicator metrics (e.g., check for a request count to find presence of a load balancer or check for database connections to figure out presence of a database).

In step 404, monitoring system 102 discovers named enterprise applications deployed on the enterprise system. The named application includes, but is not limited to, a backend application, a frontend application, a mobile application, or a uniform resource locator (URL).

In step 406, monitoring system 102 discovers existing monitors and alerts that have been previously set up for each of the named enterprise applications.

In step 408, monitoring system 102 calculates gaps in monitoring, resources and alerts by comparing the established monitoring standards and resources to monitoring services in-place for each of the enterprise applications 114. The comparison reveals gaps in expected monitoring standards as compared to actual monitor's setup during or after enterprise application deployment.

In optional step 410, monitoring system 102 repairs gaps in monitoring, resources and alerts (i.e., alert channels) by adding corresponding monitors, resources and alerts (alerting channels or configurations) based on the gap analysis. These monitors, resources and alerts may be added based on the established standards, customizations and resources available. These repairs close (reduce) the gaps in expected monitoring standards as compared to actual monitor's setup during or after enterprise application deployment.

In step 412, monitoring system 102 notifies the enterprise application customer by populating a user interface with graphics reflecting existing monitors, gaps in monitoring. An example notification GUI is provided in association with FIG. 6. Customers may, in one embodiment, search all of their monitors by either responding directly or indirectly to the notification process. For example, a customer may sort and review all monitors displayed in the notification GUI that pertain to their applications. In another example, the system may recognize the customer (e.g., credentials) and provide a window into only their monitors.

In step 414, monitoring system 102 reports, to a customer, gaps in monitoring and alerting (and optional repairs) for all applications across the enterprise.

Figure 5:
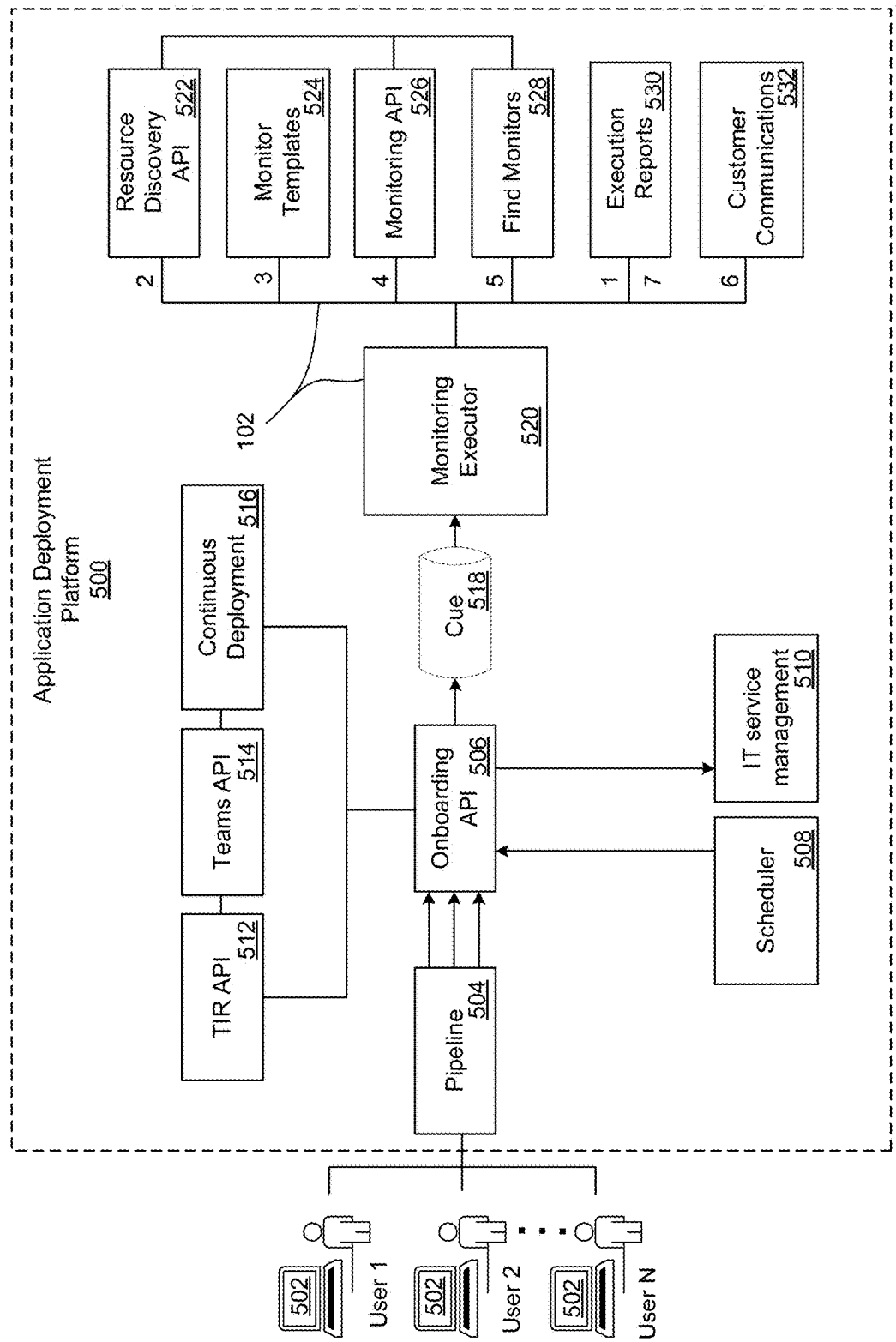
FIG. 5 depicts a technical architecture diagram illustrating an architecture of the automation system, according to some embodiments.

FIG. 5 depicts the technical architecture employed to automate the discovery, gap analysis, repairing and reporting. In addition, monitoring system 102 may be, in various embodiments integrated with or separate (e.g., configured as a separate standalone system) from application deployment platform 500.

As a non-limiting example with regard to FIGS. 1-4, one or more processes described with respect to FIG. 5 may be performed by monitoring system 102. Moreover, it is to be appreciated that not all steps may be needed to perform the disclosure provided herein. Further, some of the steps may be performed simultaneously or in a different order than shown in FIG. 5, as will be understood by a person of ordinary skill in the art.

Architecture 500 may include one or more server devices (e.g., a host server, a web server, an application server, etc.), a data center device, or a similar device. Each of these devices may be configured for interoperability with monitoring system 102 for monitoring enterprise applications 114. In some embodiments, the server may be implemented as a plurality of servers that function collectively as a cloud database for storing/processing data received from monitoring system 102. In accordance with disclosed embodiments, enterprise system 500 may include one or more modules including one or more management servers, cloud computing platform(s), data center(s), client device(s), and databases communicating over one or more networks. In some embodiments, various components of enterprise environment 100 may be physically disposed within an office building or physical location associated with an entity (e.g., an organization's technology assets); however, such components may also be disposed in physically separate locations but connected via a network administered by or associated with the entity.

Architecture 500 receives requests from users 502 (1-N) to deploy their application to an enterprise environment. These requests may be processed as part of a deployment Pipeline 504. For example, these requests are sequentially processed by Onboarding API (application programming interface) 506. In other embodiments, the requests may be processed based on urgency, requirement for resources, etc.

Deployment activities occurring during onboarding include, but are not limited to, release, installation, activation and version management. Release activities follow from the completed application development process and include operations to prepare a system for assembly and transfer to the computer system(s) on which it will be run in production. Therefore, it may involve determining the resources required for the system to operate with tolerable performance and planning and/or documenting subsequent activities of the deployment process. Installation involves establishing some form of command, shortcut, script or service for executing the software (manually or automatically). For complex systems, it may involve configuration of the system—possibly by asking the end user questions about its intended use, or directly asking them how they would like it to be configured—and/or making all the required subsystems ready to use. Activation is the activity of starting up the executable component of software for the first time. In larger software deployments, a main copy of the software may be installed on a production server in a production environment. Other versions of the deployed software may be installed in a test environment, development environment and disaster recovery environment.

In complex continuous delivery environments and/or software as a service systems, differently-configured versions of the system might even exist simultaneously in the production environment for different internal or external customers (this is known as a multi-tenant architecture), or even be gradually rolled out in parallel to different groups of customers, with the possibility of canceling one or more of the parallel deployments.

A plurality of modules assist Onboarding API 506 with deployment. Scheduler module 508 provides a deployment schedule for different deployments and onboarding functions per time of day. IT Service Management (ITSM) module 510 provides information about service, asset and configuration management with respect to standard tools like service managers and cloud platforms, etc. Team Information Repository (TIR) API module 512 contains information about internal Agile® teams. TIR runs as a service and provides API for remote access to the repository. A Teams API is a wrapper over TIR API. In addition, the system performs a READ operation, no edits. Continuous Deployment module 516 takes Pipeline 504 and automatically deploys changes into the production environment by automatically triggering a code check-in after unit, build, and security tests have been completed.

Cue module 518 collects completed deployments and serves as a signal to monitoring system 102 to initiate monitoring compliance processes for each deployed application. Monitoring Executor module 520 will process the various processes as described in FIGS. 1-4.

Execution Reports module (Reporting module) 530 may include one or more processing elements to create graphical user interfaces (GUIs) with graphics reflecting existing monitors, gaps in monitoring and generate corresponding reports. An example reporting/notification GUI is provided in association with FIG. 6. These reports may be, in some embodiments, prepared "before" gap and compliance measures are initiated (step 1) and then "after" gap and compliance measures are completed (step 7), thus creating a feedback loop.

Resource Discovery API module 522 may include one or more processing elements to discover resources (step 2) available to each of the enterprise applications 114. For example, a set of performance metrics measures the computational resources used by the application for the load, indicating whether there is adequate capacity to support the load, as well as possible locations of a performance bottleneck. Measurement of these quantities establishes an empirical performance baseline for the application. The baseline may then be used to detect changes in performance. Changes in performance may be correlated with external events and subsequently used to predict future changes in application performance.

Monitor Templates (Standards) module 524 may include generating (step 3) a database of performance standards. For example, a set of performance metrics defines the performance experienced by end users of the application. One example of performance is average response times under peak load. The components of the set include load and response times. The load is the volume of transactions processed by the application, e.g., transactions per second (TPS), requests per second, and pages per second. The response times are the times required for an application to respond to a user's actions at such a load.

Monitoring API module 526 may include one or more processing elements to compare standards and resources (monitoring templates 524) to monitoring services in-place for each of the enterprise applications 114 as determined by Find Monitors nodule 528. The comparison reveals gaps in expected monitoring standards as compared to actual monitor's setup after enterprise application deployment. A feedback loop allows this process to be repeated as repairs (new monitors are added) are completed.

Customer Communications module 532 provides reports, to a customer, of gaps in monitoring and alerting (and optional repairs) for all applications across the enterprise environment.

FIG. 6 depicts a user interface diagram illustrating monitoring status, according to some embodiments. It is to be appreciated that not all information displayed may be needed to perform the disclosure provided herein. Further, some of the features of user interface 602 may be displayed in a different order than shown in FIG. 6, as will be understood by a person of ordinary skill in the art.

Monitoring compliance GUI 602 provides, in an example embodiment, monitoring/alert setup compliance graphically as percentage segments 606 (100% compliance), segment 608 (0.1-99% compliance) and segment 610 (0% compliance). Corresponding alert compliance segments 612 (100% compliance), segment 614 (0.1-99% compliance) and segment 616 (0% compliance) provide graphical indicators of alert notification compliance. Compliance may be illustrated in aggregate by 618 and 620 across an enterprise environment or broken down by specified tech areas 622 and 624.

Compliance GUIs may be further aggregated into tiers. For example, as shown in chart 604, tier 0 reflects alerts that require immediate assistance while tier 1 reflects informational alerts. More or less tiers may be implemented without departing from the scope of the technology described herein.

Benefits of the technology described herein include, but are not limited to, reduced learning curve, reduced onboarding, automatic configuration and upkeep of monitors/dashboards, enhanced developers' experience, faster time-to-market, required monitoring out of the box and implicit integration with application/infrastructure (no unmonitored system).

Figure 7:
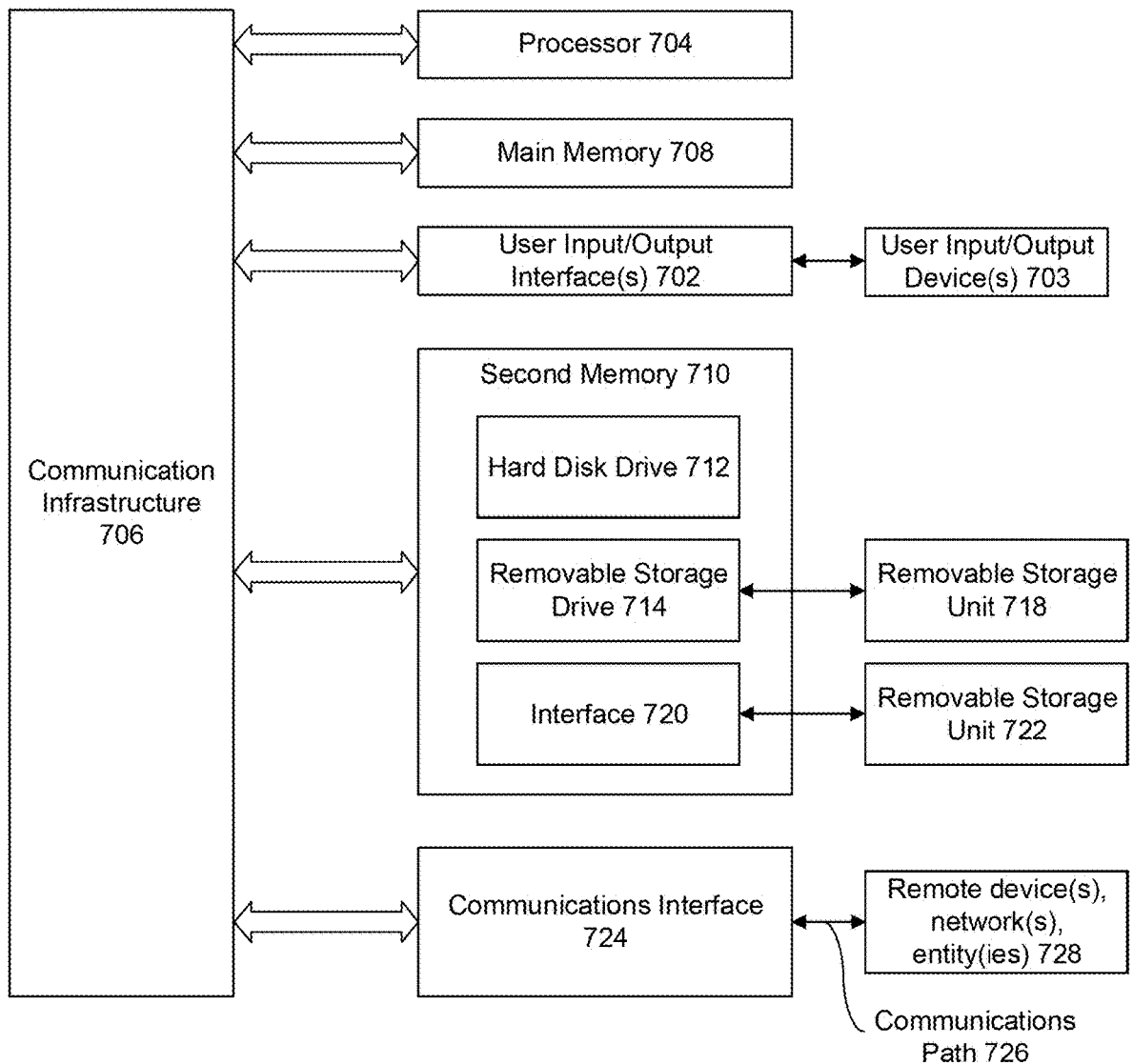
FIG. 7 depicts an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof. Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
deploying, by a computer device, an enterprise application on an application delivery platform;
determining, by the computer device, monitoring objectives for the deploying enterprise application;
discovering, by the computer device, existing monitors of the deploying enterprise application;
measuring, by the computer device, an effectiveness of the monitoring representative of a ratio of a number of monitors found to an expected number of monitors;
automatically trigger, by the computer device and as part of a deployment pipeline of the application delivery platform, determining one or more gaps in the monitoring based on a comparison of the monitoring objectives and the existing monitors; and
displaying, by the computer device, a graphical user interface (GUI) reflecting the one or more gaps in the monitoring and the measured effectiveness.

2. The method of claim 1, further comprising discovering, by the computer device, enterprise application resources associated with the deploying enterprise application.

3. The method of claim 2, wherein the deploying enterprise application resources include any of: an infrastructure stack, a container, a commonly used tag, or a named application.

4. The method of claim 3, wherein the named application includes any of: a backend application, a frontend application, a mobile application, or a uniform resource locator (URL).

5. The method of claim 1, wherein the monitoring objectives are based on standards for any of: an enterprise architecture, enterprise monitoring, enterprise site reliability engineering (SRE), resiliency, risk, a line of business (LOB) or best practices for monitoring enterprise resources.

6. The method of claim 1, further comprising categorizing, by the computer device, the existing monitors into tiers based on urgency.

7. The method of claim 1, further comprising discovering, during the discovering of existing monitors, alerting channels or alerting configurations.

8. The method of claim 7, further comprising:
determining, during the deploying, one or more gaps in the alerting channels or the alerting configurations and the monitoring objectives; and
automatically reporting the one or more gaps in the alerting channels or the alerting configurations.

9. The method of claim 8, wherein the reporting is further based on any of: gap thresholds, monitoring duration, or alerting.

10. The method of claim 8, further comprising providing notifications of creation of new monitors, the alerting channels or the alerting configurations.

11. The method of claim 8, further comprising reporting any of: the one or more gaps in the monitoring, new monitors, alerting channels or alerting configurations for a plurality of deploying enterprise applications.

12. The system of claim 1, further comprising continuously calculating the one or more gaps over time.

13. The method of claim 1, further comprising calculating a monitoring deficiency based on the comparison indicative of a degree of shortcoming of the existing monitors to the monitoring objectives.

14. The method of claim 13, further comprising:
comparing the monitoring deficiency to a predefined gap threshold; and allowing or prohibiting customization of monitoring standards based on the comparison of the monitoring deficiency to the predefined gap threshold.

15. A system comprising:
a host server having a processor communicatively coupled to a memory, the processor configured to:
establish monitoring and alert standards for an application delivery platform;
discover application resources for an application deploying on the application delivery platform, wherein the application resources comprise at least an infrastructure stack;
discover, based on the application resources, existing monitors and alerts of the application deploying on the application delivery platform;
measure an effectiveness of the monitoring representative of a ratio of a number of monitors found to an expected number of monitors;
automatically trigger, as part of a deployment pipeline of the application delivery platform, a calculation of gaps between the existing monitors and alerts and the monitoring and alert standards; and
generate a user interface reflecting the gaps between the existing monitors and alerts and the monitoring and alert standards and the measured effectiveness.

16. The system of claim 15, wherein the application resources further comprise any of: a container, a commonly used tag, or a named application.

17. The system of claim 15, further comprising a reporting mechanism to report the gaps between existing monitors and alerts for a plurality of deploying applications.

18. A non-transitory computer readable medium storing instructions that when executed by one or more processors of a device cause the one or more processors to:
establish monitoring standards for an enterprise application deploying on an application delivery platform;
discover application resources for the enterprise application deploying on the application delivery platform, wherein the application resources comprise at least an infrastructure stack;
discover, based on the application resources, existing monitors for the enterprise application deploying on the application delivery platform;
measure an effectiveness of the monitoring representative of a ratio of a number of monitors found to an expected number of monitors;
automatically trigger, as part of a deployment pipeline of the application delivery platform, a calculation of differences between the existing monitors and the monitoring standards; and
report the differences between the existing monitors and the monitoring standards and the measured effectiveness.

19. The non-transitory computer readable medium of claim 18, wherein the monitoring standards are based on any of: an enterprise architecture, enterprise monitoring, enterprise site reliability engineering (SRE), resiliency, risk or a line of business (LOB), alerts or best practices for monitoring enterprise resources.

20. The non-transitory computer readable medium claim 18, wherein the differences are based on any of: monitoring thresholds, monitoring duration, alerting channels or alerting standards.

* * * * *